United States Patent [19]
Woo et al.

[11] Patent Number: 6,024,492
[45] Date of Patent: Feb. 15, 2000

[54] HEMISPHERICAL BEARING APPARATUS

[75] Inventors: Gi-myung Woo; Hwan-young Choi, both of Kyonggi-do, Rep. of Korea

[73] Assignee: Samsung Electronics Co., Ltd., Kyungki-do, Rep. of Korea

[21] Appl. No.: 09/112,323

[22] Filed: Jul. 9, 1998

[30] Foreign Application Priority Data

Jul. 9, 1997 [KR] Rep. of Korea ........................ 97-31661

[51] Int. Cl.$^7$ .................................................. F16C 17/10
[52] U.S. Cl. ............................................ 384/108; 384/109
[58] Field of Search .................................. 384/108, 109, 384/206, 208, 213

[56] References Cited

U.S. PATENT DOCUMENTS 5,707,718  1/1998  Matsukawa et al. .................... 384/108
5,709,480  1/1998  Hong ........................................ 384/108

*Primary Examiner*—Lenard A. Footland
*Attorney, Agent, or Firm*—Sughrue, Mion, Zinn, Macpeak & Seas, PLLC

[57] ABSTRACT

A hemispherical bearing apparatus includes a $MoS_2$ layer formed to a predetermined thickness on the surface of a hemispherical recessed portion formed in a bushing or on the surface of a hemispherical member opposed to the recessed portion. The hemispherical bearing apparatus is capable of enhancing the productivity and reducing the fabrication cost. The method for forming the $MoS_2$ layer may vary with the material of the bushing and the hemispherical members. The $MoS_2$ layer may be applied by a coating technology or an impregnating technology.

9 Claims, 3 Drawing Sheets

HEMISPHERICAL BEARING APPARATUS

BACKGROUND OF THE INVENTION

1. Field of the Invention

The present invention relates to a hemispherical bearing apparatus. In particular, the hemispherical bearing apparatus has a coating of molybdenum disulfide ($MoS_2$) on either the surface of a hemispherical recessed portion formed in a bushing or the hemispherical surface of a hemispherical member opposed to the hemispherical recessed portion.

2. Description of the Related Art

Recently, with rapid developments in the computer industry, a variety of driving motors for driving various apparatuses such as a polygon mirror driving apparatus of a laser printer, a spindle motor of a hard disk and a VCR head driving motor, require highly accurate and super high speed rotation of a rotating member thereof. The rotating member generally has a rotary shaft at the rotational center. The driving motor must achieve high speed rotation without vibration or oscillation of the rotary shaft of the rotating member to perform data retrieving, saving and regenerating operations more quickly and with more accuracy.

For the rotating member to achieve high accuracy and super high speed rotation without vibration or oscillation, various motors together with various hydrodynamic bearing apparatuses for rotating the motors have been developed. In the various hydrodynamic bearing apparatuses, hemispherical bearing apparatuses have been developed that support the radial load and the thrust load at the same time and are suitable for super high speed rotation.

A conventional polygon mirror driving apparatus of a laser printer including such a hemispherical bearing apparatus will be described with reference to FIG. 1.

The polygon mirror driving apparatus includes: a fixing shaft 20 that is a rotational center of a polygon mirror 10; hemispherical members 30 and 35 having a hemispherical surface with a high sphericity and press-fitted onto the fixing shaft 20; a bushing 40 for supporting a radial load and a thrust load of the hemispherical members 30 and 35; a rotor 55 and a stator 50 that are driving apparatuses; a hub 60; and a lower housing 70.

The connection of the polygon mirror 10, the fixing shaft 20, the hemispherical members 30 and 35, and the bushing 40 will be described hereinafter. The fixing shaft 20 is press-fitted into the lower housing 70. The hemispherical members 30 and 35 are press-fitted onto the fixing shaft 20. A dynamic pressure generating groove (not shown) for generating a predetermined hydrodynamic pressure is formed on the hemispherical surfaces of the hemispherical members 30 and 35. The hub 60 on which the polygon mirror 10 and the rotor 55 are installed is press-fitted onto the bushing 40. The hemispherical members 30 and 35 and the fixing shaft 20 are fixed and the bushing 40 can be rotated with respect to the fixing shaft 20.

The bushing 40 supporting the radial load and the thrust load of the hemispherical members 30 and 35, has a cylindrical shape and includes therein a through hole having a larger diameter than the diameter of the fixing shaft 20. The bushing 40 also includes recessed portions 30a and 35a that are symmetrically formed in both ends thereof. The sphericities of the recessed portions 30a and 35a are the same as the sphericities of the hemispherical members 30 and 35, respectively. A spacer 40a is inserted into the through hole of the bushing 40 between the hemispherical members 30 and 35 in order to form clearances between the hemispherical members 30 and 35 and the hemispherical recessed portions 30a and 35a.

Referring to FIG. 2A, the surface of the hemispherical recessed portion 35a formed in the bushing 40 is coated with a titanium nitrogen (TiN) layer 32. Referring to FIG. 2B, the surface of the hemispherical member 35 opposed to the hemispherical recessed portion 35a is coated with a double layer of a TiN layer 32 and a diamond-like carbon (DLC) layer 34 on the TiN layer 32. The TiN layer 32 has a high resistance against abrasion and can increase the durability of the recessed portion 35a and the hemispherical member 35. The DLC layer 34 has lower friction factors and can increase the lubricity of the hemispherical member 35.

However, the bearing apparatus including such a bushing and hemispherical members suffers several disadvantages.

First, costly coating equipment and a great amount of time are required for coating the bushing and the hemispherical members with the TiN layer and the DLC layer. Typically two hours is taken for forming the TiN layer or the DLC layer of one micron thick. Accordingly a great amount of time is taken for forming the double layer of several microns.

Second, since the coating process is carried out at a high temperature of 500° C., the material for forming the bushing and the hemispherical members is limited accordingly. For example, if the hemispherical member is formed of aluminum, that melts at 300° C., the bushing and the hemispherical members cannot be coated with the TiN layer or the DLC layer at the temperature of 500° C. Accordingly, only iron material can be used as the material for the bushing and the hemispherical members.

SUMMARY OF THE INVENTION

It is therefore an object of the present invention to reduce the fabricating cost of a hemispherical bearing apparatus by forming a bushing and hemispherical members of a material which is inexpensive and allows easy fabrication.

One aspect of the invention relates to a hemispherical bearing apparatus comprising a bushing, and a pair of hemispherical members which are rotatably inserted in the bushing. The pair of hemispherical members are opposed by hemispherical surfaces thereof with a spacer in between. A $MoS_2$ layer is formed on either the surface of a hemispherical recessed portion formed in the bushing or the hemispherical surface of the hemispherical member opposed to the hemispherical recessed portion.

Aluminum or injection-molded plastic may be used as the material for the bushing and the hemispherical members.

The $MoS_2$ layer is formed by a coating technology or an impregnating technology. Preferably, the $MoS_2$ layer is cured after being formed. The curing is carried out at a temperature of 150° C.

Another aspect of the invention relates to a hemispherical bearing apparatus comprising a bushing and a pair of hemispherical members which are rotatably inserted in the bushing. The pair of hemispherical members are opposed by hemispherical surfaces thereof with a spacer in between. A layer of $MoS_2$ is formed on either the surface of a hemispherical recessed portion formed in the bushing or the hemispherical surface of the hemispherical member opposed to the hemispherical recessed portion, and a layer of TiN or DLC is formed on the other thereof.

The member with the $MoS_2$ layer formed thereon may be formed of aluminum or plastic and the other member with the TiN or DLC layer formed thereon may be formed of steel.

BRIEF DESCRIPTION OF THE DRAWINGS

The above object and other advantages of the present invention will become more apparent by describing in detail the preferred embodiment thereof with reference to the attached drawings, in which.

DETAILED DESCRIPTION OF THE PREFERRED EMBODIMENTS

A preferred embodiment of the present invention will be described more fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. For description purposes, elements having basically the same function as previously described conventional elements are identified using common reference numbers throughout the drawings.

Figure 3:
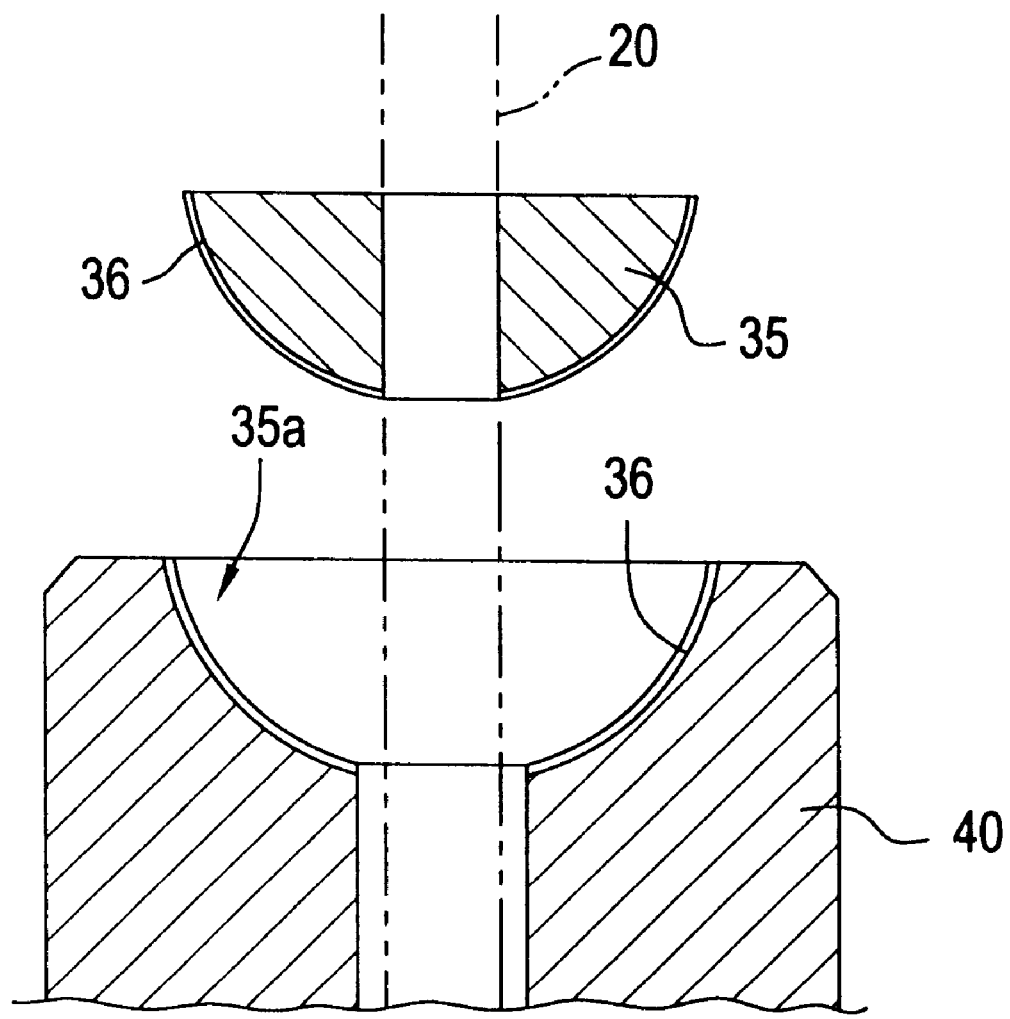
FIG. 3 is a cross sectional view of a bushing and a hemispherical member of a hemispherical bearing apparatus according to the present invention.

FIG. 3 is an exploded cross sectional view of an embodiment of a bearing apparatus according to the present invention. For the sake of clarity, only one hemispherical bearing member and recess portion is illustrated.

As shown in FIG. 3, a MoS$_2$ layer 36 is formed on the surface of the hemispherical recessed portion 35a formed in the bushing 40. On the surface of the hemispherical member 35 opposed to the hemispherical recessed portion 35a, a MoS$_2$ layer 36 is also formed.

The fabrication of the bushing and the hemispherical members of the bearing apparatus according to the present invention will be described hereinafter.

Figure 1:
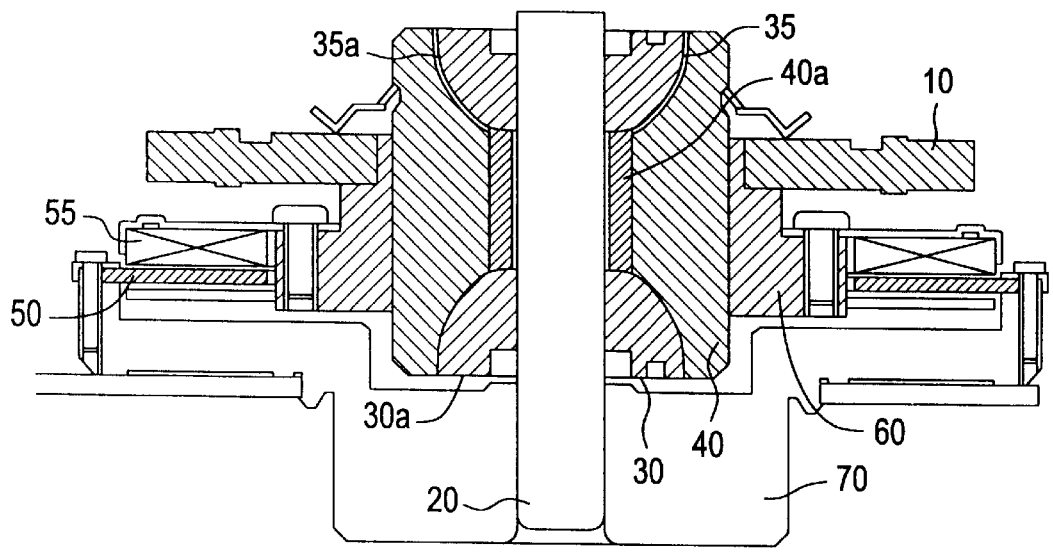
FIG. 1 is a cross sectional view of a polygon mirror driving apparatus of a laser printer including a conventional hemispherical bearing apparatus.
Figure 2A:
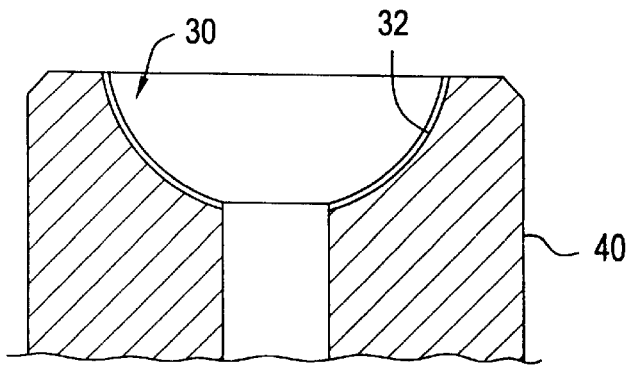
FIGS. 2A and 2B are cross sectional views of a bushing and a hemispherical member of the hemispherical bearing apparatus of FIG. 1.
Figure 2B:
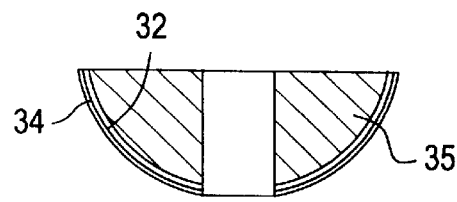
Figure 4:
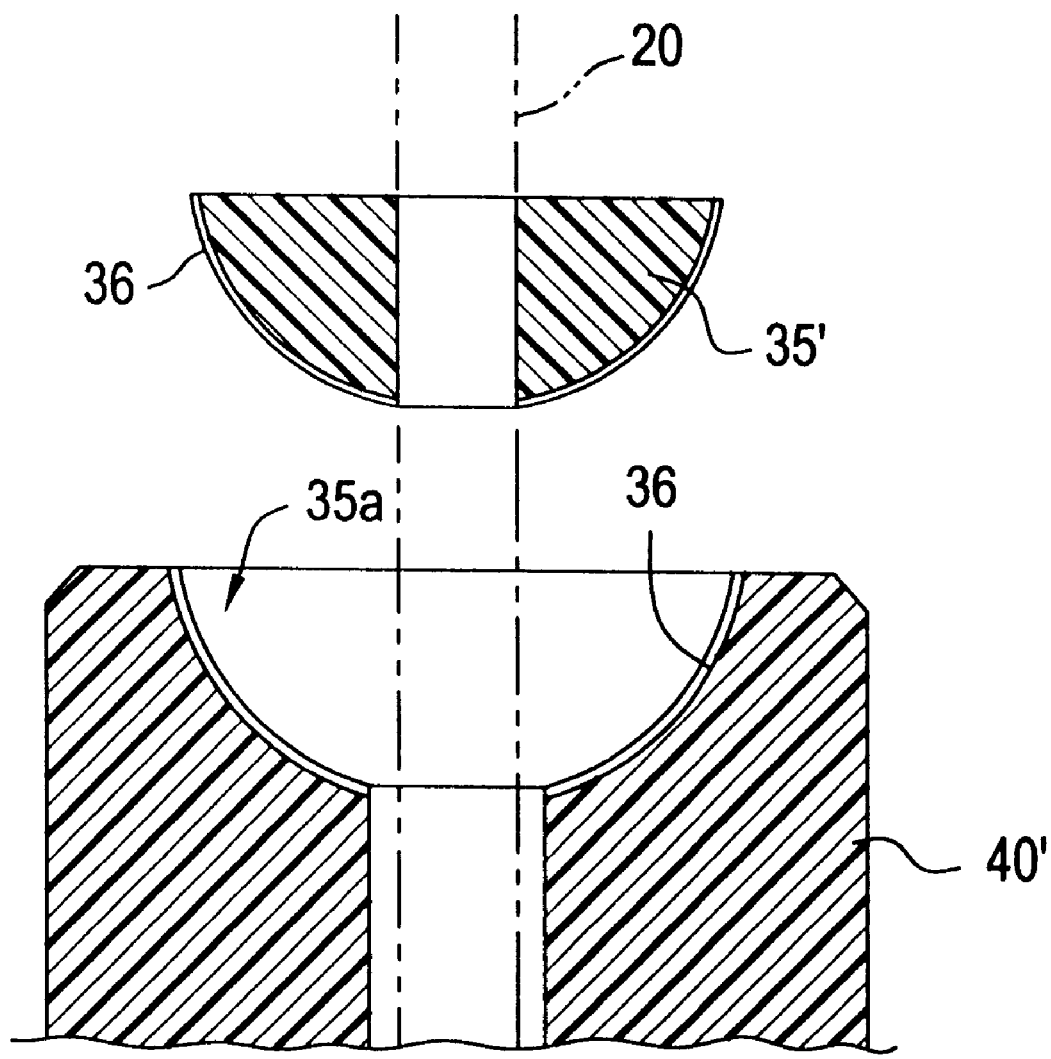
FIG. 4 is a cross sectional view of a bushing and a hemispherical member formed of plastic according to the present invention.

A through hole for insertion of a fixing shaft 20 is formed in the bushing 40. Hemispherically recessed portions 30a and 35a (see FIG. 1) are formed in upper and lower ends of the bushing 40. According to the present invention, aluminum or injection-molded plastic which is inexpensive and allows easy fabrication may be used as the material for the bushing 40. FIG. 4 shows the bushing 40' formed of plastic (note that in FIG. 4 like elements are denoted by like reference numerals). The surface of the recessed portions 30a, 35a of the bushing 40 are lapped and polished. Thereafter, a MoS$_2$ layer 36 of several microns is coated on the surfaces of the recessed portions 30a, 35a. Thereafter, the MoS$_2$ layer 36 is cured at a temperature of approximately 150° C.

Also, the hemispherical member 30, 35 is formed from an original material which is formed into a predetermined shape. Then, a through hole is formed in the hemispherical member 30, 35. The surface of the hemispherical member 30, 35 is lapped and polished. Thereafter, a MoS$_2$ layer 36 is coated on the lapped and polished surface of the hemispherical member 30, 35. The surface of the hemispherical member 30, 35 is then cured at a temperature of approximately 150° C. The original material for the hemispherical member 30, 35 may be aluminum or injection molded plastic (see FIG. 4, hemispherical member 35') which is inexpensive and allows easy fabrication.

The method for forming the MoS$_2$ layer 36 depends on the kind of the original material forming the hemispherical member 30, 35. When the hemispherical member 30, 35 is formed of a dense material, the MoS$_2$ layer 36 may be directly coated to a predetermined thickness on the surface thereof. When the hemispherical member 30, 35 is formed of a porous material, the MoS$_2$ layer 36 may be impregnated on the surface thereof by immersing the hemispherical member 30, 35 in a MoS$_2$ liquid.

According to another embodiment of a bearing apparatus according to the present invention, either the surface of the hemispherical recessed portion 30a, 35a formed in the bushing 40 or the hemispherical surface of the hemispherical member 30, 35 opposed to the hemispherical recessed portion is coated with MoS$_2$, and the other surface is coated with TiN or DLC.

Since one of the surfaces of the recessed portion formed in the bushing and the hemispherical surface of the hemispherical member opposed to the recessed portion is coated with a harder layer, abrasion is reduced.

The TiN or DLC layer is formed by a known coating technology. The original material of the bushing 40 or the hemispherical member 30, 35 may be steel.

The hemispherical member processed as aforementioned has several advantages.

First, an inexpensive material such as aluminum or plastic can be used for forming the hemispherical member. As a result, fabricating costs can be reduced.

Second, a single layer of MoS$_2$ can be used instead of a conventional double layer without any degradation of the efficiency. Accordingly, the total fabricating process may be simplified and the productivity may be enhanced.

Third, costly coating equipment is not required as in conventional apparatuses. This may also reduce the fabricating cost.

As aforementioned, the hemispherical bearing apparatus according to the present invention includes a bushing and hemispherical members wherein at least one of the surfaces of the hemispherical recessed portion formed in the bushing and the hemispherical member opposed to the hemispherical recessed portion is coated with a MoS$_2$ layer having a predetermined thickness. This results in an enhanced productivity and a reduced fabricating cost.

This invention has been described above with reference to the aforementioned embodiments. It is evident, however, that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A hemispherical bearing apparatus comprising a bushing, and a pair of hemispherical members which are rotatably inserted into the bushing in such a manner that said pair of hemispherical members are opposed by hemispherical surfaces thereof with a spacer in between, wherein a MoS$_2$ layer is formed on one of a surface of a hemispherical recessed portion formed in said bushing and a surface of said hemispherical member opposed to said hemispherical recessed portion.

2. The hemispherical bearing apparatus according to claim 1, wherein a material for said bushing and said hemispherical members includes aluminum.

3. The hemispherical bearing apparatus according to claim 1, wherein a material for said bushing and said hemispherical members includes plastic.

4. The hemispherical bearing apparatus according to claim 1, wherein said $MoS_2$ layer is formed on one of said bushing or said hemispherical member with said $MoS_2$ layer by coating.

5. The hemispherical bearing apparatus according to claim 1, wherein said $MoS_2$ layer is formed on one of said bushing or said hemispherical member with said $MoS_2$ layer by impregnating.

6. The hemispherical bearing apparatus according to claim 4 or 5, wherein, after being formed, said $MoS_2$ layer is cured.

7. The hemispherical bearing apparatus according to claim 6, wherein said curing is performed at a temperature of 150° C.

8. A hemispherical bearing apparatus comprising a bushing, and a pair of hemispherical members which are rotatably inserted into the bushing in such a manner that said pair of hemispherical members are opposed by hemispherical surfaces thereof with a spacer in between, wherein a $MoS_2$ layer is formed on one of a surface of a hemispherical recessed portion formed in said bushing and a surface of said hemispherical member opposed to said hemispherical recessed portion, and a TiN or DLC layer is formed on the other surface.

9. The hemispherical bearing apparatus according to claim 8, wherein one of said bushing or said hemispherical member with said $MoS_2$ layer formed thereon is formed of aluminum or plastic and the other surface having said TiN or DLC layer formed thereon is formed of steel.

* * * * *